United States Patent
Rodgers (10) Patent No.: US 10,002,134 B2
(45) Date of Patent: Jun. 19, 2018

(54) PLACARD-TO-PIN INTERACTION (71) Applicant: CoStar Realty Information, Inc., Washington, DC (US)

(72) Inventor: Jerry Rodgers, Laguna Beach, CA (US)

(73) Assignee: CoStar Realty Information, Inc., Washington, DC (US)

( * ) Notice: Subject to any disclaimer, the term of this patent is extended or adjusted under 35 U.S.C. 154(b) by 388 days.

(21) Appl. No.: 15/041,694

(22) Filed: Feb. 11, 2016

(65) Prior Publication Data

US 2017/0169035 A1 Jun. 15, 2017

Related U.S. Application Data (60) Provisional application No. 62/267,682, filed on Dec. 15, 2015.

(51) Int. Cl.
  *G06F 17/30* (2006.01)
  *G06Q 50/16* (2012.01)

(52) U.S. Cl.
  CPC .... *G06F 17/30061* (2013.01); *G06F 17/3053* (2013.01); *G06F 17/30241* (2013.01); *G06Q 50/16* (2013.01)

(58) Field of Classification Search
  CPC ........... G06F 17/3053; G06F 17/30241; G06F 17/30061
  See application file for complete search history.

(56) References Cited

U.S. PATENT DOCUMENTS

| 8,176,440 B2* | 5/2012 | Stading ............ G06F 17/30554 715/853 |
| 8,312,010 B1 | 11/2012 | Chen |
| 8,589,069 B1* | 11/2013 | Lehman ................ G01C 21/20 340/995.1 |
| 8,832,115 B2 | 9/2014 | Smintina |
| 8,930,837 B2 | 1/2015 | Walkin |
| 9,104,293 B1 | 8/2015 | Komfeld |
| 9,378,571 B1* | 6/2016 | Jones ...................... G06T 11/60 |
| 2006/0026170 A1* | 2/2006 | Kreitler ............. G06F 17/30241 |
| 2010/0094548 A1* | 4/2010 | Tadman ................. G01C 21/36 701/533 |

(Continued)

*Primary Examiner* — Kris E Mackes
(74) *Attorney, Agent, or Firm* — Fish & Richardson P.C.

(57) ABSTRACT

Methods, systems, and apparatus for receiving a query; selecting one or more entities responsive to the query; providing, for display on a map portion of an interface, map-based representations of the one or more entities; providing, for display on a list portion of the interface, list-based representations of one or more of the entities; generating an additional query based on selection of a particular map-based representation of a particular entity; determining that, when the particular map-based representation was selected, a particular list-based representation was visible on the list portion; adjusting a ranking score for the particular entity; ranking the particular entity among one or more other entities identified as responsive to the additional query; and providing, for display on the list portion, list-based representations of at least one of the one or more other entities, including the particular list-based representation which remains visible on the list portion.

21 Claims, 5 Drawing Sheets

(56) References Cited

U.S. PATENT DOCUMENTS

| | | | | |
|---|---|---|---|---|
| 2012/0304087 A1* | 11/2012 | Walkin | ............. | G06F 17/30241 |
| | | | | 715/764 |
| 2013/0097162 A1* | 4/2013 | Corcoran | .......... | G06F 17/30241 |
| | | | | 707/724 |
| 2013/0151422 A1 | 6/2013 | Berry | | |
| 2014/0372217 A1* | 12/2014 | Seacat Deluca | .. | G06F 17/30554 |
| | | | | 705/14.54 |
| 2016/0084667 A1* | 3/2016 | Ziezold | ............. | G01C 21/3682 |
| | | | | 345/428 |
| 2016/0171011 A1* | 6/2016 | Drogobetski | ..... | G06F 17/30241 |
| | | | | 707/722 |

* cited by examiner

PLACARD-TO-PIN INTERACTION

CROSS-REFERENCE TO RELATED APPLICATIONS

This application claims priority to U.S. Provisional Application Serial No. 62/267,682, filed on Dec. 15, 2015, which is hereby incorporated by reference in its entirety.

FIELD

The present specification generally relates to search engines.

BACKGROUND

It is increasingly popular for users to request search results presented along with information about their associated locations on a map. For example, users are able to search for entities on a map and have information about the entities displayed on or adjacent to the map. The users may interact with both the map as well as the information about the entities.

SUMMARY

While users have access to a vast amount of location-based data, many users have difficulty processing that data to extract the information they desire. For example, users may be presented with a list of entities responsive to a query and be forced to separately search for each entity on a map, or switch between a list view and a map view of the search results. In general, an aspect of the subject matter described in this specification may involve a process by which entities responsive to a query are identified and representations of the entities are concurrently displayed on both a map and a list. When the user selects a particular representation on the map corresponding to a particular entity, the displayed map is adjusted thereby generating an additional query. A particular representation on the list corresponding to the particular entity that was visible when the particular representation on the map was selected is determined. Entities responsive to the additional query are identified and representations of the entities are concurrently displayed on both a map and a list, but the particular entity remains visible on the list. Accordingly, a user may more easily and more efficiently browse amongst entities responsive to a query. This process has wide applicability, for example, to searches for products, businesses, services, real estate such as commercial properties and residential properties both for sale and for rent, other places of interest, other location-based data, and the like, or any combination thereof.

One innovative aspect of the subject matter described in this specification is embodied in methods that include the actions of receiving a query that comprises search input data; selecting one or more entities that are identified as responsive to the query; providing, for display on a map portion of a query response interface, map-based representations of the one or more entities identified as responsive to the query; providing, for display on a list portion of a query response interface, list-based representations of at least one of the one or more entities identified as responsive to the query; determining that a particular map-based representation that is associated with a particular entity has been selected; generating an additional query based on determining that the particular map-based representation that is associated with the particular entity has been selected; selecting one or more other entities that are identified as responsive to the additional query, the one or more other entities comprising the particular entity; determining that, when the particular map-based representation that is associated with the particular entity was selected, a particular list-based representation that is also associated with the particular entity was visible on the list portion of the query response interface; adjusting a ranking score for the particular entity; ranking the particular entity among the one or more other entities that are identified as responsive to the additional query based at least on the ranking score for the particular entity; providing, for display on the map portion of the query response interface, map-based representations of the one or more other entities identified as responsive to the additional query; and providing, for display on the list portion of the query response interface, list-based representations of at least one of the one or more other entities identified as responsive to the additional query, the list-based representations of at least one of the one or more entities identified as responsive to the additional query comprising the particular list-based representation which remains visible on the list portion of the query response interface.

These and other implementations may each optionally include one or more of the following features. For instance, another aspect of the subject matter described in this specification may be embodied in methods that include the actions of determining that a particular list-based representation visibly displayed on the list portion of the query response interface has been selected; and identifying the particular entity and the particular map-based representation associated with the particular list-based representation that has been selected.

According to another aspect of the subject matter described in this specification, adjusting a ranking score for the particular entity comprises at least one of: (i) adjusting the ranking score for the particular entity to promote the ranking of the particular entity, and (ii) adjusting a ranking score for at least one of the entities that is not the particular entity to demote the ranking of at least one of the entities that is not the particular entity relative to the ranking of the particular entity.

Another aspect of the subject matter described in this specification may be embodied in methods that include the actions of modifying a visual feature of at least one of the particular list-based representation and the particular map-based representation in response to determining that a particular map-based representation that is associated with a particular entity has been selected.

Another aspect of the subject matter described in this specification may be embodied in methods that include the actions of generating an additional query in response to determining at least one of: an adjustment to the zoom level or size of the map portion, a change to the search input data for the query, and additional search input data for the query.

In some implementations, the particular map-based representation represents multiple entities including the particular entity. In some implementations, the entities include a residential or commercial property.

Other implementations of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
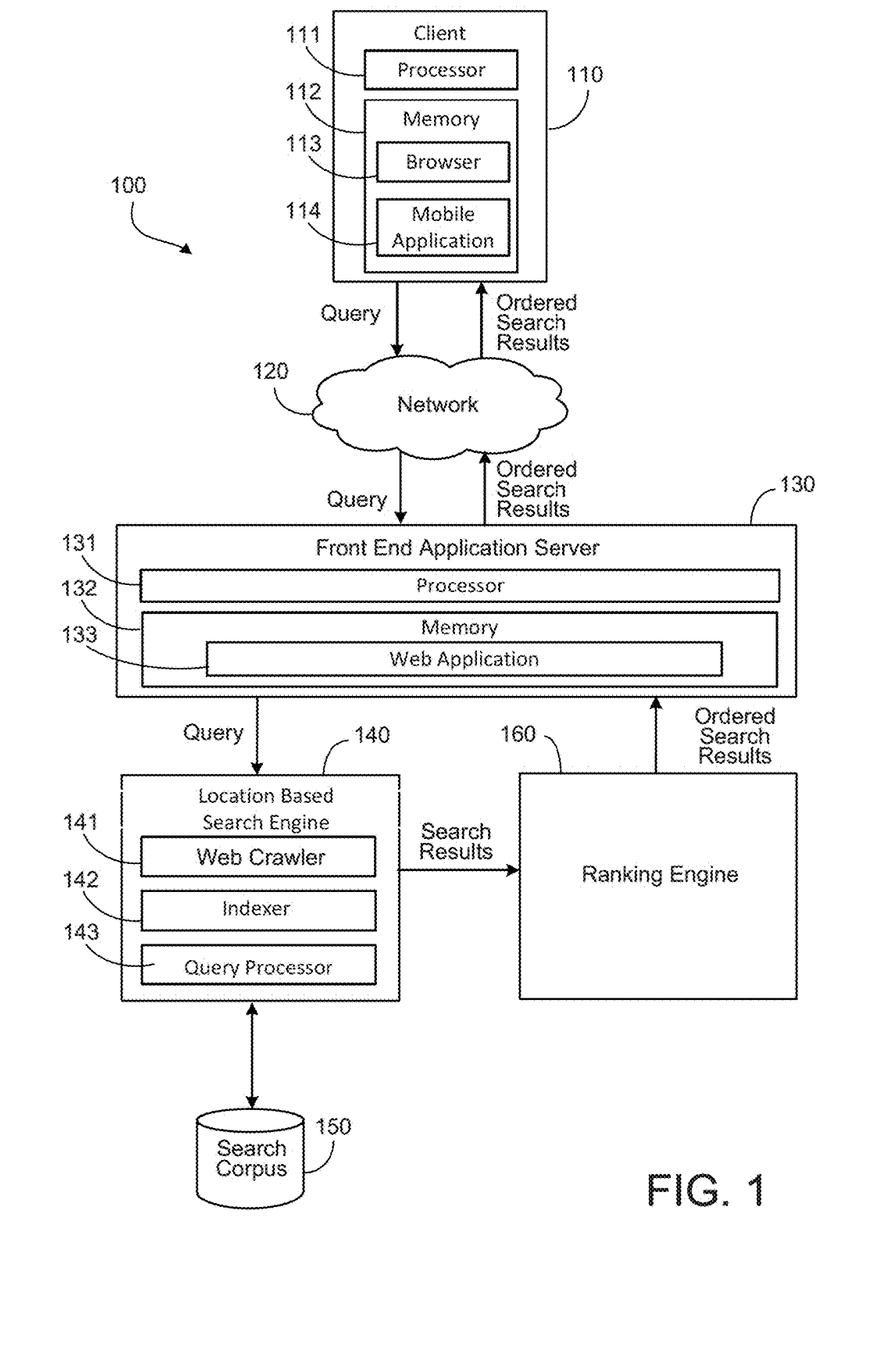
FIG. 1 depicts an example search engine system, according to one example implementation.

FIG. 1 depicts an example search engine system 100, according to one example implementation. The system 100 may include a client device 110, a network 120, a front-end application server 130, a location based search engine 140, a search corpus database 150, and a ranking engine 160.

Client device 110 may be representative of one, or multiple, client devices. The client device 110 may include a mobile computing platform or a non-mobile computing platform. Mobile computing platforms may include, for example, a smartphone, tablet, laptop computer, or other thin client devices. Non-mobile computing platforms may include, for example, desktop computers, set top box entertainment systems, video game consoles, or the like. Client device 110 may be configured to communicate with front-end application server 130 via network 120 using one or more communication protocols.

The client device 110 of system 100 may include at least a processor 111 and a memory 112. The memory 112 may provide for the storage of computer program code associated with one or more applications installed on client 110. The applications may include, for example, a browser 113 or mobile application 114. Processor 111 may be configured to execute the stored computer program code in a manner that allows client 110 to realize the functionality provided by the applications. Processor 111 may also be configured to execute instructions to realize the functionality associated with any of the actions attributed to client 110 below.

The client 110 may be able to access one or more web based applications 133 hosted by front-end application server 130 via network 120 using browser 113. Such web based applications may include, for example, an application that facilitates identification of one or more particular entities that may be available for sale, for lease, or that provide a particular service. An entity may include any item that may be available for sale or lease such as, for example, a book, a clothing item, a motor vehicle, a consumer electronic item, a house, an apartment, or the like. Alternatively, an entity may include a party that provides a service such as, for example, a restaurant, a barber shop, a day care facility, a school, a doctor's office, a law office, a government agency, or the like. Web application 133 may utilize one or more back-end components in order to identify one or more particular entities based on search input parameters. In certain instances, web application 133 may utilize the methods set forth herein to identify a set of one or more entities that are responsive to a query.

Identification of entities may be achieved by using client device 110 to search one or more databases such as, for example, search corpus database 150 and then using one or more back-end components to identify and return ordered search results to client device 110. A user may initiate a search with client device 110 by interacting with one or more search fields provided by web application 133 via a browser 113. For instance, a user may provide an input into a search field that can be used as at least a portion of a search query. Then, the user may instruct the client device 110 to transmit the search query to front-end application server 130 via network 120. Alternatively, or in addition, a user may input a search query by drawing one or shapes around a location of interest on a map provided by a graphical user interface. Client device 110 may then generate a query to identify entities that may reside within geographic locations associated with the one or more shapes drawn by the user on the map provided by a graphical user interface, and transmit the query to front-end application server 130. The front-end application server 130 may then forward the query to one or more back-end data processing systems that may execute the search query. The backend system may identify a set of search results response to the search query, rank each search result in the set of search results, and then return the set of search results that are responsive to the received query to the front-end application server 130. The front-end application server 130 may then forward the search results back to client device 110.

The search results may be displayed on a graphical user interface associated with client device 110 in a variety of different ways that may assist a user in understanding and interpreting the search results. For instance, the search results may be displayed as a list of one or multiple entities, wherein each entity in the list is ordered according to a rank determined by one or more backend components of system 100 such as, for example, ranking engine 160. Alternatively, the search results may be displayed by plotting one or multiple graphical icons on a map of a geographical area that each correspond to a particular entity identified as a search result that is responsive to a received search query. The location of each graphical icon on the map may be indicative of the location of the corresponding entity. In certain instances, search results may be displayed as both a ranked list of entities in a first portion of the graphical user interface and as a plot of graphical icons on a map in a second portion of the graphical user interface. Other ways of displaying search results also fall within the scope of this specification.

Separate from browser 113, a client device 110 may also be able to use a mobile application 114 in order for a user of client device 110 to avail himself of the same, or similar, functionality that was described above as being provided by a web application 133 via browser 113. Mobile application 114 may include an executable software program that was previously downloaded from a mobile application provider. Mobile application 114 may be configured to relay commands input by a user such as, for example, search queries to the front-end application server 130. After receiving a search query from mobile application 114, the front-end application server 130 may request that one or more backend components execute the search query, rank the search results, and then return the ranked search results to mobile application 114, which may display the search results as a ranked list of entities, as plotted graphical icons on a map, or a combination thereof.

Network 120 may be configured to facilitate connectivity between a client device 110 and the front-end application server 130. Client 110 and front-end application server 130 may be connected to network 120 via one or more wired, or wireless, communication links. Network 120 may include any combination of one or more types of public and/or private networks including but not limited to a local area network (LAN), wide area network (WAN), the Internet, a cellular data network, or any combination thereof.

Front-end application server 130 may include at least a processor 131 and a memory 132. The memory 132 may provide for the storage of computer program code associated with one or more applications hosted by front-end application server 130. The applications may include, for example, a web application 133 that may facilitate identification of one or more particular entities that may be available for sale, for lease, or that provide a particular service. Processor 131 may be configured to execute the stored computer program code in a manner that allows front-end application server 130 to realize the functionality provided by the applications. Processor 131 may also be configured to execute instructions to realize the functionality associated with any of the actions attributed to front-end application server 130 below.

Front-end application server 130 may serve as an interface between the client 110 and the back-end components of system 100 that may include, for example, a location based search engine 140, search corpus database 150, and ranking engine 160. Front-end application server 130 may be comprised of one or more server computers. Front-end application server 130 may be configured to receive commands from a client device 110, and translate those commands, if necessary, into a format that is compatible with one or more back-end network components. Front-end application server 130 may also employ network security applications such as, for example, a firewall, user authentication, subscription verification, or the like in an effort to supervise access to one or more back-end network components, if necessary.

Front-end application server 130 may also facilitate session management for each browsing session initiated by each respective client device 110 that is currently using a browser 113, or mobile application 114, to avail itself of the services provided by the web application 133. For instance, front-end application server 130 may employ functionality to associate an identifier with each query received by the front-end application server 130 from a particular client 110. The front-end application server 130 may later utilize the identifier in order to associate ordered search results received from a ranking engine 160 with a query received from a particular client 110. The identifier may then be used to return the set of ordered search results to the client device 110 that initiated the query. The identifier may include a user identifier, device identifier, transaction identifier, or the like System 100 may also include a location based search engine 140. Location based search engine 140 may be configured to receive and execute search queries that are associated with a location component. The location component of the search query may be based on a particular location that was input by a user via client device 110. The location component may be the location of the particular client device 110, or some other location that the user of client device 110 has input as an entity search parameter. Alternatively, the location component of the search query may be obtained by front-end application server 130, a back-end network component, or another network component associated with system 100 based on one or more attributes associated with a client device 110. For instance, one of the aforementioned network components may determine the current location of a client device 110. Alternatively, the current location of a client device 110 may be provided to one or more network components of system 100 by a third party. Alternatively, the location component may be determined based on locations that the client device 110 has recently traveled. The location component may include, for example, a neighborhood, a city, a state, a zip code, GPS coordinates, longitude and latitude coordinates, or the like.

Location based search engine 140 may include a web crawler 141, an indexer 142, and a query processor 143. The location based search engine 140 may be hosted by one or multiple server computers. The server computer(s) hosting the location based search engine 140 may be the same server computer(s) that provide the front-end application server 130. Alternatively, however, the server computer(s) hosting the location based search engine 140 may be a different set of one or more server computer(s) that are configured to communicate with the front-end application server 130 via one or more public or private networks.

Web crawler 141 may be configured to traverse computers connected to a computer network such as, for example, the Internet, to scan and identify data associated with particular entities. For instance, web crawler 141 may scan computers associated with a computer network in order to identify web pages, or other files accessible via the computer network, that may include data associated with one or multiple entities that are currently being offered for sale or lease. Alternatively, or in addition, web crawler 141 may scan computers associated with a computer network in order to identify web pages, or other files accessible via the computer network, that may include data associated with one or multiple entities that are currently offering a particular service. The identified web pages, or a subset of the raw data associated therewith, may be stored in search corpus database 150. In some implementations, web crawler 141 may be autonomous software that is configured to periodically scan computer networks in order to identify new, or previously undiscovered, web pages or other network accessible files associated with entities that are currently being offered for sale, for lease, or that may provide a service. Alternatively, or in addition, the functionality of web crawler 141 may be performed by one or more operators of location based search engine 140. For instance, a group of one or more analysts may obtain raw data associated with an entity, and store the raw data in search corpus database 150. Alternatively, or in addition, it is contemplated that a party that offers an entity for sale, for lease, or that provides a service may also upload raw data associated with the entity to search corpus database 150.

The aggregated set of raw data stored in search corpus database 150 may comprise a wealth of data describing a wide spectrum of different entities. For instance, search corpus database 150 may include for each known entity, for example, the entity's name, the entity's location, a description of the entity, a value associated with the entity, or the like. The value for the entity may include, for example, the cost of an entity that is being offered for sale or for lease. Alternatively, however, the value for an entity may include, for example, an entity rating. For instance, for an entity that offers a service such as, for example, Bob's Diner, the entity rating may include a feedback score associated with Bob's Diner based on customer experience. Such entity ratings may also be associated with entities for sale or for lease.

Other types of raw data associated with an entity may be obtained via the data crawling process and stored in search corpus database 150.

Indexer 142 may be configured to analyze the raw data obtained during the crawling process in order to make the raw data searchable. For instance, indexer 142 parse the raw data and extract one or more types of relevant data. For example, the indexer 142 may analyze the raw data to extract an entity's name, an entity's location, and a value associated with the entity. Indexer 142 may than associate the extracted data with one or more keywords. The associated keywords may be compared to aspects of received search queries in order to determine whether the extracted data associated with the keywords is responsive to the search query.

Query processor 143 may be configured to receive a search query from front-end application server 130 that originated at a client device 110. Query processor 143 may be configured to parse the received query, extract any relevant keyword(s) from the received query, and then execute the query against the index generated by indexer 142. Query processor 143 may alter the form of one or aspects of the received query. For instance, query processor 143 may alter one or more keywords in order to expand or narrow the scope of a received query, as necessary. Such alterations to keywords of a query may include, for example, utilizing a root expander, replacing one or more characters with a wildcard character, insertion of one or more Boolean operators between keywords, dynamically altering location information associated with the query, or the like. Query processor 143 may also translate one or more aspects of the received query in order to make the query compatible with the index that is associated with the search corpus database 150. Query processor 143 may then execute the query against the search corpus database 150. Execution of the search query against the search corpus 150 may yield a set of one or multiple search results. The search results may identify, for example, a group of one or multiple links that are associated with entities that are responsive to the query received from client 110. The search result links may reference a web page that includes information associated with the particular entity that corresponds to reach respective link. The information included in the web page may be drawn from search corpus database 150. The set of search results may be substantially unordered, or otherwise arranged in an order that is not based on entity value. The search results identified by the query processor 143 in response to the received search query may then be passed to the ranking engine 160. In some implementations, the current value metric for each entity associated with an identified search result may also be passed to ranking engine 160 by location based search engine 140. The location based search engine 140 may communicate with the ranking engine using one or more public or private networks.

System 100 may also include a ranking engine 160. Ranking engine 160 may be hosted by one or multiple server computers. The server computer(s) hosting the ranking engine 160 may be the same server computer(s) that provide the front application server 130. Alternatively, however, the server computer(s) hosting the location based ranking engine 160 may be a different set of one or more server computer(s) that are configured to communicate with the front-end application server 130 via one or more public or private networks.

Ranking engine 160 may be configured to perform a series of post processing operations on the set of identified search results. The post processing operations may determine a ranking score that may be associated with each result in the set of search results based on the analysis of a metric associated with each entity responsive to a query. Ranking engine 160 may then return the set of ordered results to the front-end application server 130 via one or more public or private networks. Front-end application server may then provide the ordered search results to client device 110 via network 120.

Ranking engine 160 may be configured to isolate and analyze search results based on a predetermined geographic region. A geographic region may include, for example, a neighborhood, a city, a state, a zip code, GPS coordinates, longitude and latitude coordinates, a shape drawn by a user on a graphical user interface map, or the like. Once a set of set search results are isolated by geographic region, the ranking engine may analyze the entities associated with each search result. Ranking engine 160 may assign a score to a search result associated with a particular entity.

In some aspects of the present disclosure, ranking engine 160 may be utilized only when requested by a user of client device 110. If a user decides to not use ranking engine 160, the search results may be provided to the client device in the order determined by location search engine 140. Such order may be, for example, based on most expensive price, lowest price, based on an analysis of keyword frequency in a web page associated with the search result corresponding to the entity, based on payments received to increase a ranking score associated with each entity, or the like, or any combination thereof. Accordingly, client 110 may be able to toggle ranking engine 160 on and off.

Figure 2A:
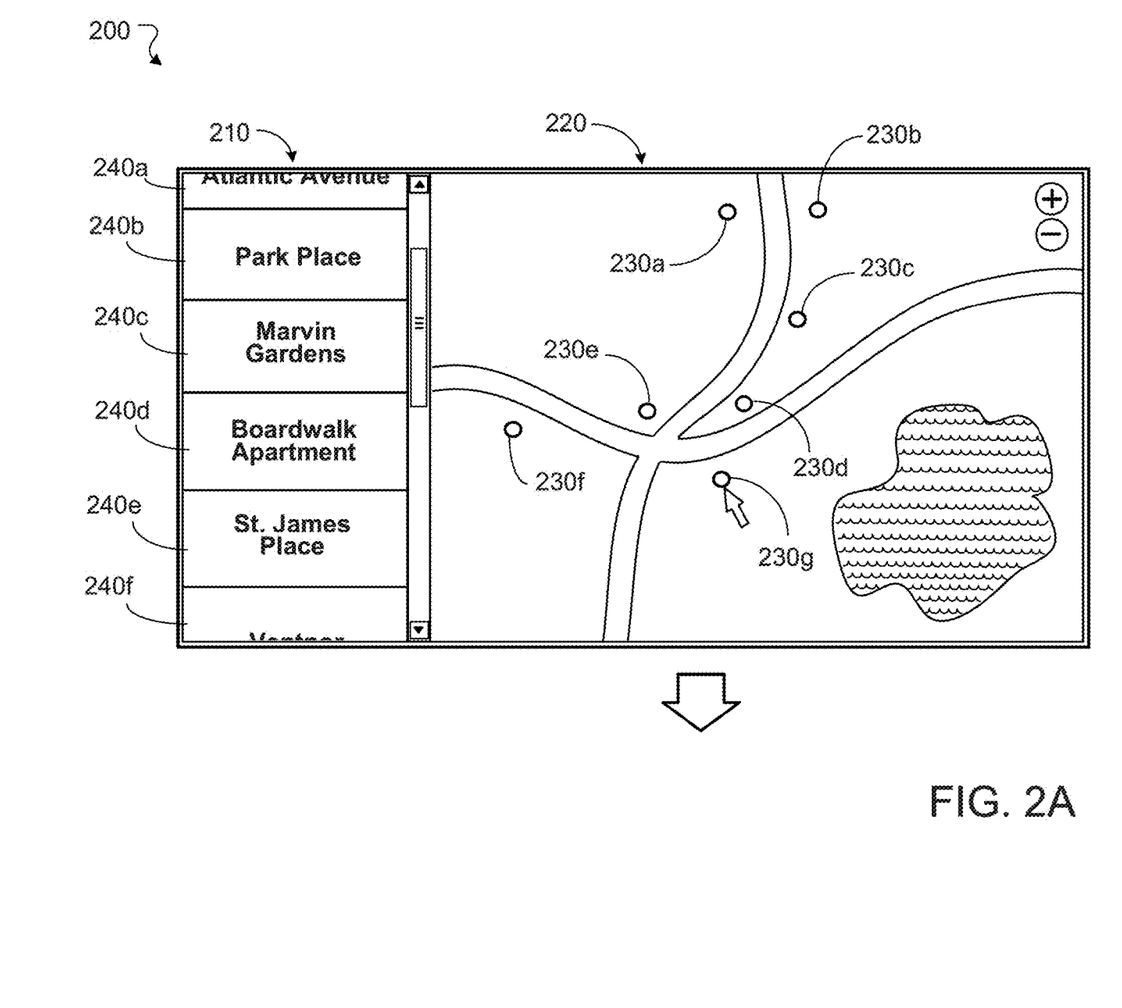
FIGS. 2A and 2B depict exemplary graphical user interfaces for concurrently displaying entities responsive to a query on a map and a list, according to one example implementation.

FIG. 2A depicts an exemplary graphical user interface 200 for concurrently displaying entities responsive to a query on a map and a list, according to one example implementation. The graphical user interface 200 may include a list portion 210 and a map portion 220. The graphical user interface 200 may represent, for example, a webpage or an application. The graphical user interface 200 may be accessed through an application, such as a browser or other application running on a personal or mobile computing device, and may represent a page or screen provided in association with a search engine.

The list portion 210 may include one or more list-based representations 240*a-f* of entities that are identified as responsive to an inputted query. The list portion 210 may also include a scrollbar to enable scrolling in a list when there are more items in the list than may be viewed at once. For example, in FIG. 2A, list portion 210 includes additional list-based representations not shown that become visible upon scrolling the list. The list-based representations 240*a-f* in the list portion 210 may include text, images, or a combination of text and images associated with entities identified as responsive to a query. Although list portion 210 is shown with list-based representations 240*a-f* arranged in a vertical manner with respect to one another, list-based representations 240*a-f* may alternatively be arranged in a horizontal manner.

The map portion 220 may include one or more map-based representations 230*a-g* of entities that are identified as responsive to an inputted query. Any of map-based representations 230*a-g* may correspond to more than one entity identified as responsive to a query. For example, map-based representation 230*g* may correspond to multiple entities identified as responsive to a query. A map-based representation may correspond to more than one entity when, for example, multiple entities are located closely together in a cluster. In certain embodiments, each of the list-based representations in list portion 210, including those not shown in FIG. 2A, may have a corresponding map-based representation. The location of each map-based representation on the map portion 220 may be indicative of the location of the corresponding entity or entities. The zoom level of the map portion 220 may be adjusted, for example, by a user selecting a plus sign to zoom in and a minus sign to zoom out. The area displayed in the map portion 220 may be adjusted, for example, by selecting and moving the map in any direction.

As a user browses the list displayed in list portion 210, the user may select one of the list-based representations via an input device, e.g., by clicking on one of the list-based representations or by hovering the cursor over one of the list-based representations. In response to an indication that one of the list-based representations is selected, a visual feature of a corresponding map-based representation on map portion 220 may be changed, e.g., highlighted, color change, shape change, size change, or the like, or any combination thereof. When the map is adjusted, for example, by a change in the zoom level, an additional query may be generated for the changed map area, and entities responsive to the additional query may be identified. List-based representations of those entities may be displayed on list portion 210 and map-based representations of those entities may be displayed on map portion 220. When one of the list-based representations has been selected, and the additional query is generated based on the adjusted map, the selected list-based representation remains visible on the list portion among the list-based representations of the entities responsive to the additional query.

In the example depicted in FIG. 2A, map-based representation 230g may correspond to multiple entities including list-based representation 240c of residential property Marvin Gardens, list-based representation 240d of residential property Boardwalk Apartment, as well as two additional list-based representations not shown in FIG. 2A. The list-based representation of each of those entities may be part of the scrollable list, but the single map-based representation 230g may be used to represent that cluster of multiple entities.

Figure 2B:
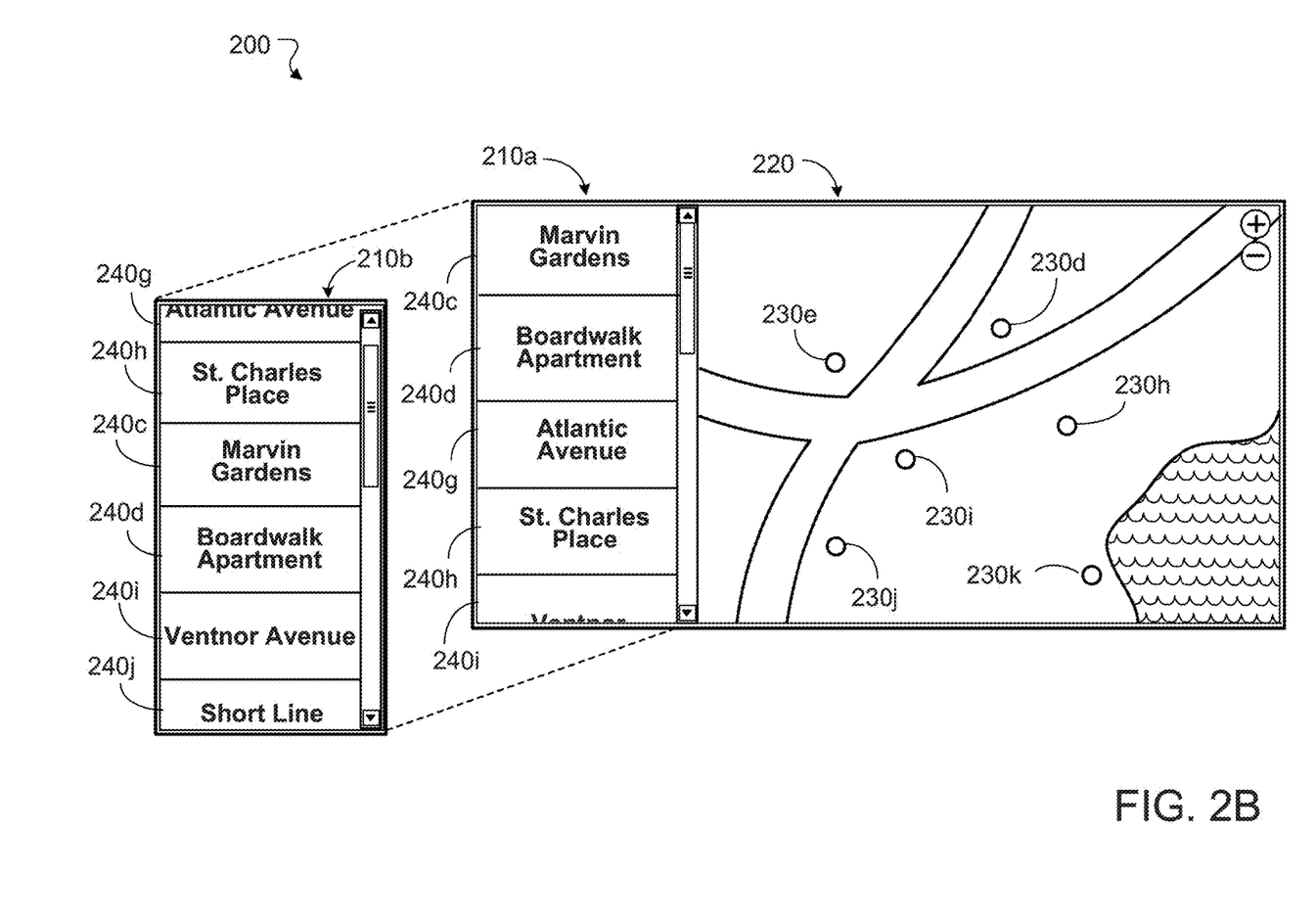

A user may select one of the map-based representations via an input device, e.g., by clicking on one of the map-based representations. If the selected map-based representation is a map-based representation that corresponds to multiple entities, i.e., a cluster, the map-portion 220 may be changed to display map-based representations of the multiple entities, for example, by zooming to a level at which the map-based representations of the multiple entities may be distinguished, as depicted in FIG. 2B. Thus, for example, in response to an indication that a user has selected map-based representation 230g of FIG. 2A, which corresponds to multiple entities including list-based representation 240c of residential property Marvin Gardens and list-based representation 240d of residential property Boardwalk Apartment displayed on list portion 210, the map-portion 220 may be changed to display map-based representations of the multiple entities, for example as depicted in FIG. 2B. When the selection of map-based representation 230g is determined, the list-based representations corresponding to map-based representation 230g that are visible on list portion 210 at the time of the selection may be determined. For example, list-based representation 240c of residential property Marvin Gardens and list-based representation 240d of residential property Boardwalk Apartment may be determined to be visible on list portion 210 when map-based representation 230g is selected.

FIG. 2B depicts an exemplary graphical user interface for concurrently displaying entities responsive to the additional query on a map and a list, according to one example implementation. The graphical user interface 200 of FIG. 2B is similar to that of FIG. 2A and may include a list portion 210 and a map portion 220. In response to an indication that a user has selected map-based representation 230g of FIG. 2A, the map portion 220 may be adjusted, e.g., an increase in the zoom level, so as to display map-based representations for each of the multiple entities that were represented by map-based representation 230g. Thus, in FIG. 2B, map-based representations 230h-k of the multiple entities that were represented by map-based representation 230g are displayed.

In addition, in response to an indication that a user has selected a map-based representation of multiple entities and the map is to be adjusted, an additional query may be generated for the changed map area, and entities responsive to the additional query may be identified. The list portion 210 may include one or more list-based representations 240 of entities that are identified as responsive to the additional query. The map portion 220 may include one or more map-based representations 230d-k of entities that are identified as responsive to the additional query, including map-based representations 230h-k of the multiple entities that were represented by map-based representation 230g.

Thus, the entities identified as responsive to the additional query may include entities that were identified as responsive to the initial query. The entities identified as responsive to the additional query may include additional entities that were not identified as responsive to the initial query.

A list-based representation that was selected or that was visible on list portion 210 at the time of the selection of the map-based representation may correspond to an entity in which a user is likely interested. Thus, the ranking score of that entity may be adjusted. The list-based representation may be selected via an input object, for example, when a selection is made via a click with the input object, or hovering of the input object over the list-based representation, or the like. The list-based representation of the selected entity may remain visible on list portion 210. For example, list-based representation 240c of residential property Marvin Gardens was visible on list portion 210 of FIG. 2A when a selection of map-based representation 230g, which represents multiple entities including Marvin Gardens, was made. Thus, list-based representation 240c of residential property Marvin Gardens may appear at or near the top of the list on list portion 210a of FIG. 2B. Similarly, the list-based representation 240d of residential property Boardwalk Apartment was visible on list portion 210 of FIG. 2A when a selection of map-based representation 230g, which represents multiple entities including Boardwalk Apartment, was made. Thus, list-based representation 240d of residential property Boardwalk Apartment may appear at or near the top of the list on list portion 210a of FIG. 2B. A map-based representation 230h of Marvin Gardens may also be displayed on map portion 220. Similarly, a map-based representation 230i of Boardwalk Apartment may also be displayed on map portion 220.

In certain implementations, a list-based representation that was selected or that was visible on list portion 210 at the time of the selection of the map-based representation may remain visible on list portion 210, for example, by automatically scrolling to that list-based representation on list portion 210 after entities responsive to the additional query are identified. For example, the list-based representation 240c of residential property Marvin Gardens was visible on list portion 210 of FIG. 2A when a selection of map-based representation 230g, which represents multiple entities including Marvin Gardens, was made. Thus, the list on list portion 210*b* may be automatically scrolled to display list-based representation 240*c* of residential property Marvin Gardens at or near the same position on list portion 210*b* that it was displayed on list portion 210 at the time of the selection of map-based representation 230*g*. Alternatively, the list on list portion 210*b* may be automatically scrolled to display list-based representation 240*c* of residential property Marvin Gardens at or near the top of list portion 210*b*. Similarly, for example, the list-based representation 240*d* of residential property Boardwalk Apartment was visible on list portion 210 of FIG. 2A when a selection of map-based representation 230*g*, which represents multiple entities including Boardwalk Apartment, was made. Thus, the list on list portion 210*b* may be automatically scrolled to display list-based representation 240*d* of residential property Boardwalk Apartment at or near the same position on list portion 210*b* that it was displayed on list portion 210 at the time of the selection of map-based representation 230*g*. Alternatively, the list on list portion 210*b* may be automatically scrolled to display list-based representation 240*c* of residential property Boardwalk Apartment at or near the top of list portion 210*b*.

In this manner, the list-based representation of an entity that was selected or displayed at the time of the selection of the map-based representation remains visible even when the map displayed on the map portion changes in response to the selection of the map-based representation. In certain implementations, a change to the zoom level or to search parameters may cause the additional query to be generated and the map displayed on the map portion to be changed, rather than selection of a map-based representation. The list-based representation of an entity that was selected or displayed at the time of the change in zoom level or to search parameters may remain visible in the same manner as described above.

Figure 3:
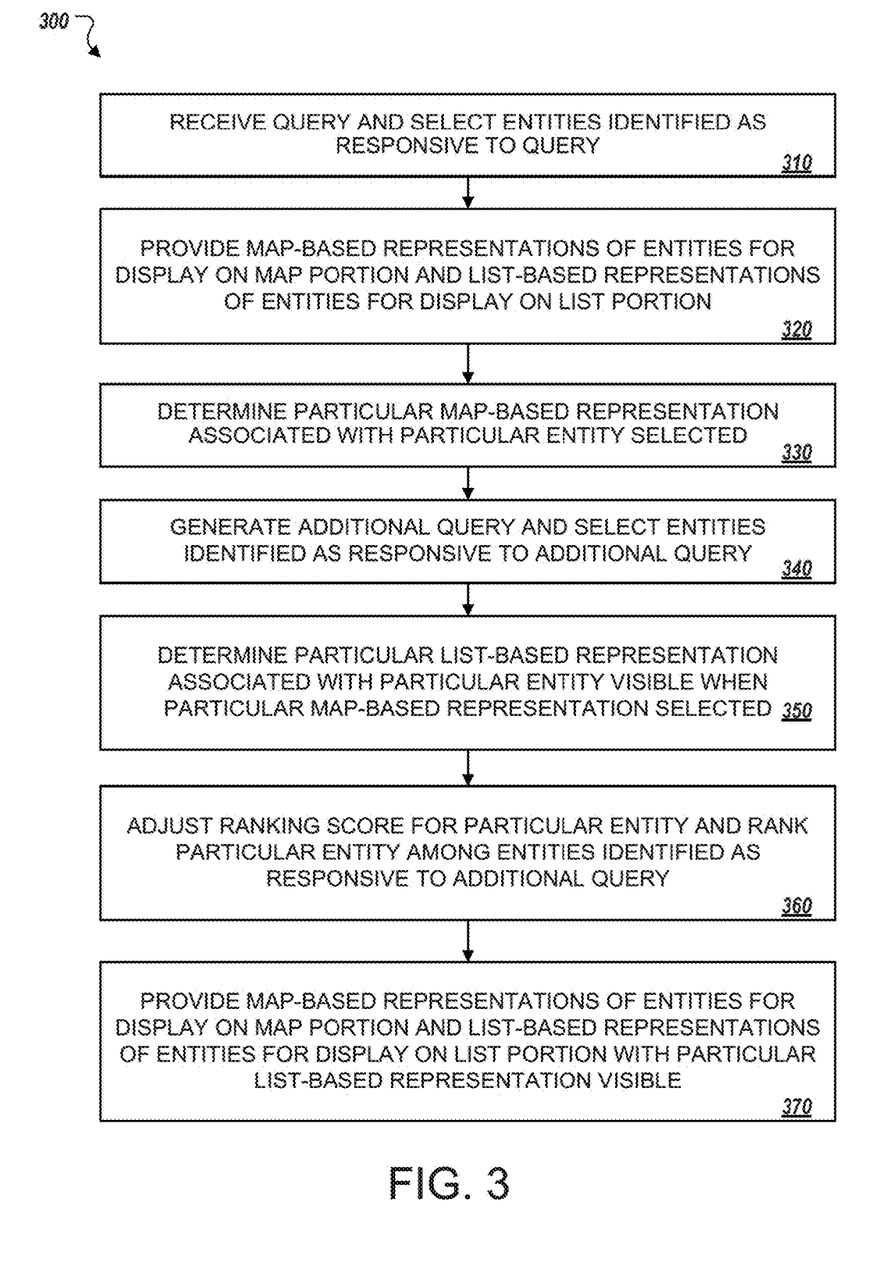
FIG. 3 depicts a flowchart of an example process for identifying, ranking, and displaying entities responsive to a query, according to one example implementation

FIG. 3 depicts a flowchart of an example process 300 for identifying, ranking, and displaying entities responsive to a query, according to one example implementation. The process may be performed by components of systems described with reference to FIGS. 1 and 4. The process 300 may include receiving a query that comprises search input data (310). The search input data may include, for example, terms; Boolean operators; location-based data such as zip code, city, town, county, neighborhood, geographical area, etc.; price; features of an item or property for lease or for sale; or the like, or any combination thereof. Further, one or more entities may be selected that are identified as responsive to the query that comprises the search input data (310).

The process 300 may include providing, for display on a map portion 220 of a query response interface 200, map-based representations 230 of the one or more entities identified as responsive to the query (320). Each of the map-based representations may correspond either to one of the entities identified as responsive to the query or to multiple entities identified as responsive to the query. The process may further include providing, for display on a list portion 210 of a query response interface 200, list-based representations 240 of at least one of the one or more entities identified as responsive to the query (320). This may include providing a scroll bar to allow for scrolling of the list on the list portion 210 when all of the list-based representations of the entities identified as responsive to the query cannot be viewed on the list portion 210.

The process 300 may include determining that a particular map-based representation that is associated with a particular entity has been selected (330). The particular map-based representation may be selected via an input object, for example, when a selection is made via a click with the input object or hovering of the input object over the map-based representation. In certain embodiments, determining that a particular map-based representation that is associated with a particular entity has been selected includes determining that a particular list-based representation corresponding to the map-based representation has been selected. The particular list-based representation may be selected via an input object, for example, when a selection is made via a click, double-click, extended click, or the like, with the input object, or hovering of the input object or cursor over the list-based representation, or the like. The particular map-based representation that has been selected may represent multiple entities including the particular entity.

The process 300 may include generating an additional query based on determining that the particular map-based representation that is associated with the particular entity has been selected (340). In certain embodiments, the additional query may be generated in response to a change or addition to the search input data or a change to the map displayed on the map portion 220, e.g., a change in the zoom level or a change in the area displayed. Thus, the process 300 may include generating an additional query in response to determining at least one of: an adjustment to the zoom level or size of the map portion, a change to the search input data for the query, and additional search input data for the query.

The process 300 may further include selecting one or more other entities that are identified as responsive to the additional query, the one or more other entities including the particular entity (340). The one or more other entities may include entities that were identified as responsive to the initial query. The one or more other entities may include additional entities that were not identified as responsive to the initial query.

The process 300 may include determining that, when the particular map-based representation that is associated with the particular entity was selected, a particular list-based representation that is also associated with the particular entity was visible on the list portion of the query response interface (350).

The process 300 may include adjusting a ranking score for the particular entity, and ranking the particular entity among the one or more other entities that are identified as responsive to the additional query based at least on the ranking score for the particular entity (360). For example, adjusting the ranking score associated with the particular entity may include adjusting the ranking score for the particular entity to promote the ranking of the particular entity. Adjusting the ranking score associated with the particular entity may include, for example, adjusting a ranking score for at least one of the entities that is not the particular entity to demote the ranking of at least one of the entities that is not the particular entity relative to the ranking of the particular entity.

The process 300 may include providing, for display on the map portion of the query response interface, map-based representations of the one or more other entities identified as responsive to the additional query (370). The process 300 may further include providing, for display on the list portion of the query response interface, list-based representations of at least one of the one or more other entities identified as responsive to the additional query. The list-based representations of at least one of the one or more entities identified as responsive to the additional query may include the particular list-based representation which remains visible on the list portion of the query response interface (370). Thus, for example, the list-based representation of an entity that was selected or displayed on the list portion 210 at the time of the selection of the map-based representation remains visible even when the map displayed on the map portion 220 changes in response to the selection of the map-based representation.

In certain implementations, the process 300 may include modifying a visual feature of at least one of the particular list-based representation and the particular map-based representation in response to determining that a particular map-based representation that is associated with a particular entity has been selected. For example, at least one of the particular list-based representation and the particular map-based representation may be highlighted, color changed, shape changed, size changed, or the like, or any combination thereof.

In certain implementations, the process 300 may include determining that a particular list-based representation visibly displayed on the list portion of the query response interface has been selected, and identifying the particular entity and the particular map-based representation associated with the particular list-based representation that has been selected. Such a determination may indicate that a user is interested in the particular entity, and the list-based representation of the particular entity may remain visible.

Figure 4:
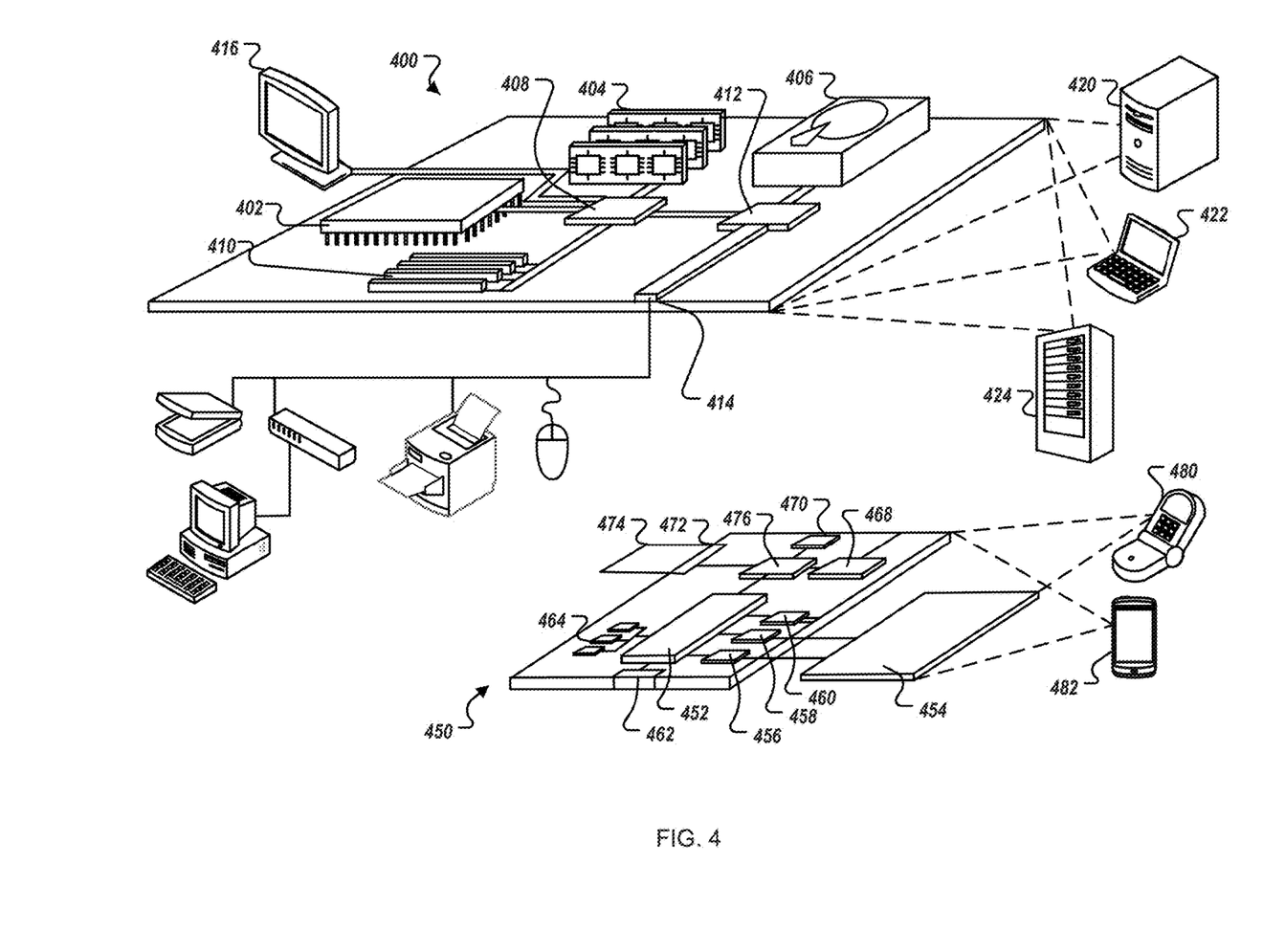
FIG. 4 depicts a computer device and a mobile computer device that may be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit the exemplary implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 648 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Exemplary implementations and all of the functional operations described in this specification can be implemented in digital electronic circuitry, or in computer software, firmware, or hardware, including the structures disclosed in this specification and their structural equivalents, or in combinations of one or more of them. Exemplary implementations can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, exemplary implementations can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Exemplary implementations can be implemented in a computing system that includes a back-end component, e.g., as a data server, or that includes a middleware component, e.g., an application server, or that includes a front-end component, e.g., a client computer having a graphical user interface or a Web browser through which a user can interact, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
   receiving a query that comprises search input data;
   selecting one or more entities that are identified as responsive to the query;
   providing, for display on a map portion of a query response interface, map-based representations of the one or more entities identified as responsive to the query;

providing, for display on a list portion of a query response interface, list-based representations of at least one of the one or more entities identified as responsive to the query;

determining that a particular map-based representation that is associated with a particular entity has been selected;

generating an additional query based on determining that the particular map-based representation that is associated with the particular entity has been selected;

selecting one or more other entities that are identified as responsive to the additional query, the one or more other entities comprising the particular entity;

determining that, when the particular map-based representation that is associated with the particular entity was selected, a particular list-based representation that is also associated with the particular entity was visible on the list portion of the query response interface;

adjusting a ranking score for the particular entity;

ranking the particular entity among the one or more other entities that are identified as responsive to the additional query based at least on the ranking score for the particular entity;

providing, for display on the map portion of the query response interface, map-based representations of the one or more other entities identified as responsive to the additional query; and providing, for display on the list portion of the query response interface, list-based representations of at least one of the one or more other entities identified as responsive to the additional query, the list-based representations of at least one of the one or more entities identified as responsive to the additional query comprising the particular list-based representation which remains visible on the list portion of the query response interface.

2. The computer-implemented method of claim 1, wherein the particular map-based representation represents multiple entities including the particular entity.

3. The computer-implemented method of claim 1, wherein adjusting a ranking score for the particular entity comprises at least one of: (i) adjusting the ranking score for the particular entity to promote the ranking of the particular entity, and (ii) adjusting a ranking score for at least one of the entities that is not the particular entity to demote the ranking of at least one of the entities that is not the particular entity relative to the ranking of the particular entity.

4. The computer-implemented method of claim 1, further comprising modifying a visual feature of at least one of the particular list-based representation and the particular map-based representation in response to determining that a particular map-based representation that is associated with a particular entity has been selected.

5. The computer-implemented method of claim 1, further comprising generating an additional query in response to determining at least one of: an adjustment to the zoom level or size of the map portion, a change to the search input data for the query, and additional search input data for the query.

6. The computer-implemented method of claim 1, further comprising:

determining that a particular list-based representation visibly displayed on the list portion of the query response interface has been selected; and identifying the particular entity and the particular map-based representation associated with the particular list-based representation that has been selected.

7. The computer-implemented method of claim 1, wherein the entities comprise a residential or commercial property.

8. A system comprising one or more computers and one or more storage devices storing instructions that are operable, when executed by the one or more computers, to cause the one or more computers to perform operations comprising:

receiving a query that comprises search input data;

selecting one or more entities that are identified as responsive to the query;

providing, for display on a map portion of a query response interface, map-based representations of the one or more entities identified as responsive to the query;

providing, for display on a list portion of a query response interface, list-based representations of at least one of the one or more entities identified as responsive to the query;

determining that a particular map-based representation that is associated with a particular entity has been selected;

generating an additional query based on determining that the particular map-based representation that is associated with the particular entity has been selected;

selecting one or more other entities that are identified as responsive to the additional query, the one or more other entities comprising the particular entity;

determining that, when the particular map-based representation that is associated with the particular entity was selected, a particular list-based representation that is also associated with the particular entity was visible on the list portion of the query response interface;

adjusting a ranking score for the particular entity;

ranking the particular entity among the one or more other entities that are identified as responsive to the additional query based at least on the ranking score for the particular entity;

providing, for display on the map portion of the query response interface, map-based representations of the one or more other entities identified as responsive to the additional query; and providing, for display on the list portion of the query response interface, list-based representations of at least one of the one or more other entities identified as responsive to the additional query, the list-based representations of at least one of the one or more entities identified as responsive to the additional query comprising the particular list-based representation which remains visible on the list portion of the query response interface.

9. The system of claim 8, wherein the particular map-based representation represents multiple entities including the particular entity.

10. The system of claim 8, wherein adjusting a ranking score for the particular entity comprises at least one of: (i) adjusting the ranking score for the particular entity to promote the ranking of the particular entity, and (ii) adjusting a ranking score for at least one of the entities that is not the particular entity to demote the ranking of at least one of the entities that is not the particular entity relative to the ranking of the particular entity.

11. The system of claim 8, wherein the operations comprise:

modifying a visual feature of at least one of the particular list-based representation and the particular map-based representation in response to determining that a particular map-based representation that is associated with a particular entity has been selected.

12. The system of claim 8, wherein the operations comprise:
generating an additional query in response to determining at least one of: an adjustment to the zoom level or size of the map portion, a change to the search input data for the query, and additional search input data for the query.

13. The system of claim 8, wherein the operations comprise:
determining that a particular list-based representation visibly displayed on the list portion of the query response interface has been selected; and
identifying the particular entity and the particular map-based representation associated with the particular list-based representation that has been selected.

14. The system of claim 13, wherein the entities comprise a residential or commercial property.

15. A computer-readable storage device storing software comprising instructions executable by one or more computers which, upon such execution, cause the one or more computers to perform operations comprising:
receiving a query that comprises search input data;
selecting one or more entities that are identified as responsive to the query;
providing, for display on a map portion of a query response interface, map-based representations of the one or more entities identified as responsive to the query;
providing, for display on a list portion of a query response interface, list-based representations of at least one of the one or more entities identified as responsive to the query;
determining that a particular map-based representation that is associated with a particular entity has been selected;
generating an additional query based on determining that the particular map-based representation that is associated with the particular entity has been selected;
selecting one or more other entities that are identified as responsive to the additional query, the one or more other entities comprising the particular entity;
determining that, when the particular map-based representation that is associated with the particular entity was selected, a particular list-based representation that is also associated with the particular entity was visible on the list portion of the query response interface;
adjusting a ranking score for the particular entity;
ranking the particular entity among the one or more other entities that are identified as responsive to the additional query based at least on the ranking score for the particular entity;
providing, for display on the map portion of the query response interface, map-based representations of the one or more other entities identified as responsive to the additional query; and
providing, for display on the list portion of the query response interface, list-based representations of at least one of the one or more other entities identified as responsive to the additional query, the list-based representations of at least one of the one or more entities identified as responsive to the additional query comprising the particular list-based representation which remains visible on the list portion of the query response interface.

16. The computer-readable storage device of claim 15, wherein the particular map-based representation represents multiple entities including the particular entity.

17. The computer-readable storage device of claim 15, wherein adjusting a ranking score for the particular entity comprises at least one of: (i) adjusting the ranking score for the particular entity to promote the ranking of the particular entity, and (ii) adjusting a ranking score for at least one of the entities that is not the particular entity to demote the ranking of at least one of the entities that is not the particular entity relative to the ranking of the particular entity.

18. The computer-readable storage device of claim 15, wherein the operations comprise:
modifying a visual feature of at least one of the particular list-based representation and the particular map-based representation in response to determining that a particular map-based representation that is associated with a particular entity has been selected.

19. The computer-readable storage device of claim 15, wherein the operations comprise:
generating an additional query in response to determining at least one of: an adjustment to the zoom level or size of the map portion, a change to the search input data for the query, and additional search input data for the query.

20. The computer-readable storage device of claim 15, wherein the operations comprise:
determining that a particular list-based representation visibly displayed on the list portion of the query response interface has been selected; and
identifying the particular entity and the particular map-based representation associated with the particular list-based representation that has been selected.

21. The computer-readable storage device of claim 15, wherein the entities comprise a residential or commercial property.

* * * * *